April 27, 1943. A. A. DORSEY 2,317,676
CORE FOR TIRE VULCANIZERS
Filed Sept. 25, 1942 2 Sheets-Sheet 2
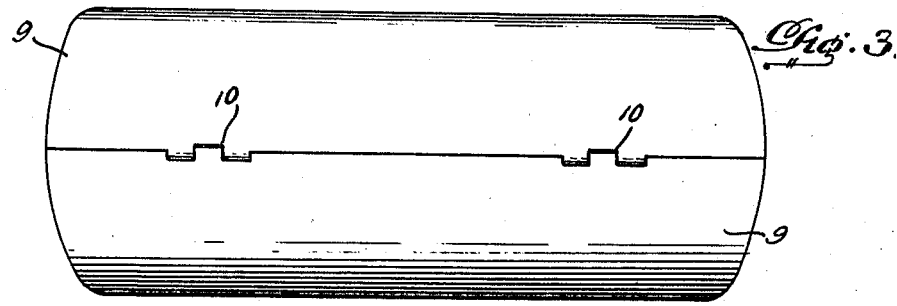
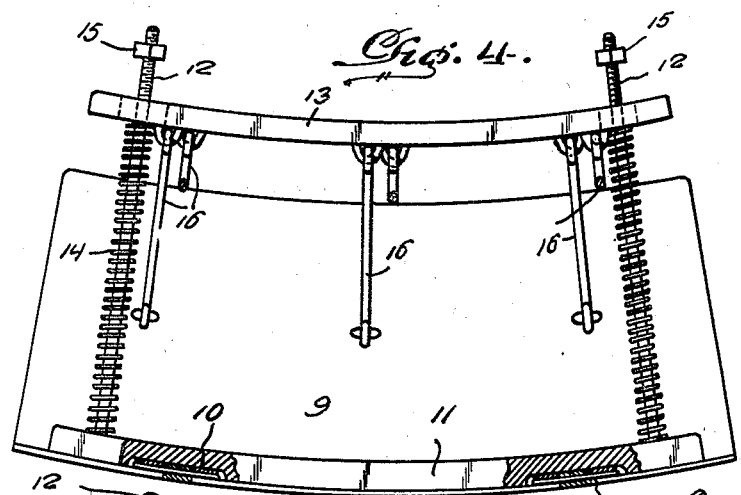
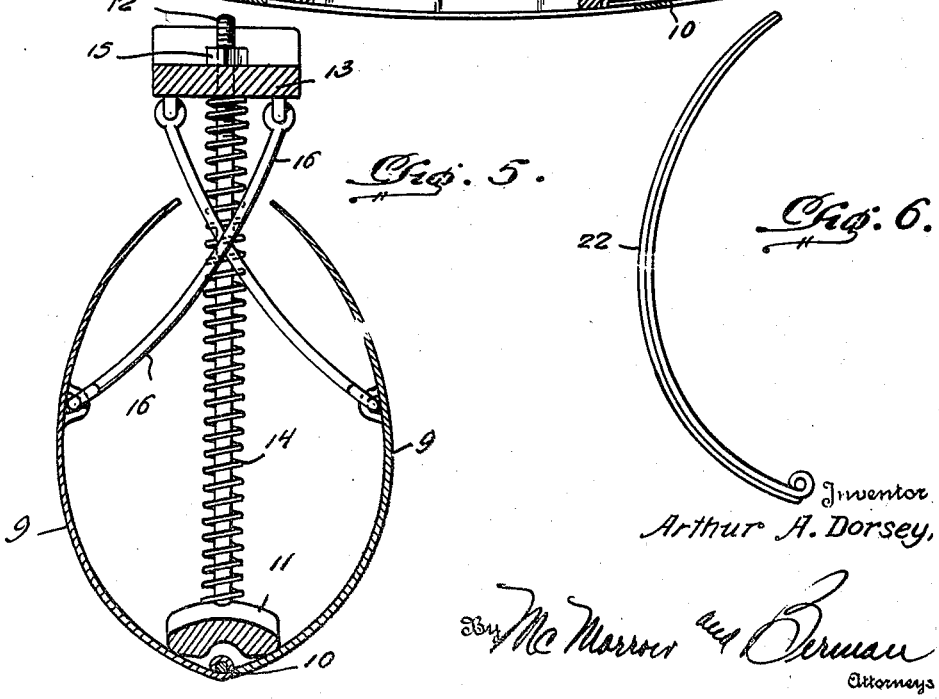
Inventor
Arthur A. Dorsey, Patented Apr. 27, 1943

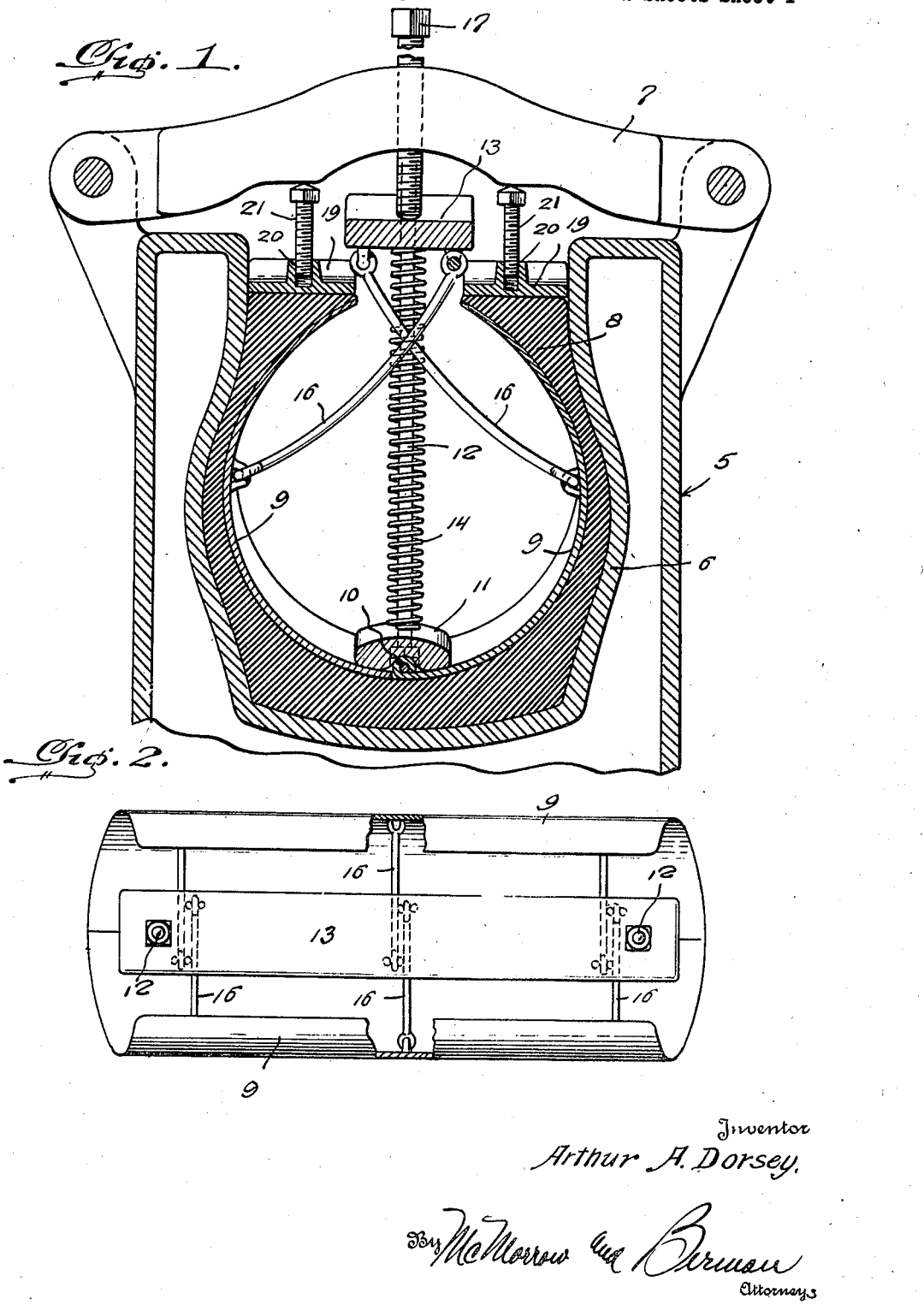

2,317,676

UNITED STATES PATENT OFFICE 2,317,676

CORE FOR TIRE VULCANIZERS

Arthur A. Dorsey, Emeryville, Calif.

Application September 25, 1942, Serial No. 459,723

5 Claims. (Cl. 18—18)

This invention relates to cores for tire curing molds employed for sectional vulcanizing of tires, and has for the primary object the provision of a mechanical device of the above stated character which is constructed to operate in combination with a mold clamp of a tire vulcanizing apparatus for sustaining the tire against walls of the mold with proper pressure to assure efficient curing of a repair made to the tire and may be easily and quickly brought into operation and removed after the curing operation has been completed.

With these and other objects in view as will become more apparent as the description proceeds, the invention consists in certain novel features of construction, combination and arrangement of parts which will be hereinafter more fully described and claimed.

For a complete understanding of my invention, reference is to be had to the following description and accompanying drawings, in which:

Figure 1 is a fragmentary transverse sectional view illustrating a portion of a tire vulcanizing apparatus with a tire therein and supported against the walls of the mold portion of the vulcanizing apparatus by a core constructed in accordance with the present invention and acting in combination with the clamp of the vulcanizing apparatus.

Figure 2 is a top plan view illustrating the core.

Figure 3 is a bottom plan view illustrating the core.

Figure 4 is a vertical sectional view illustrating the core.

Figure 5 is a transverse sectional view illustrating the core in a collapsed position.

Figure 6 is an end elevation illustrating one of the pressure plates of the core equipped with a covering.

Referring in detail to the drawings, the numeral 5 indicates a fragmentary portion of a tire vulcanizing apparatus employed for sectional curing work. The mold of the apparatus is indicated generally by the character 6 and is of a conventional construction and 7 indicates the mold clamp.

A tire, indicated by the character 8, is arranged in the mold section for curing after a repair has been made thereto. In order that the curing operation may be successfully carried out within the mold 6 the tire 8 must be held under pressure against the walls of the mold. Frequently, pneumatic cores are employed for this purpose. However, such cores require inflation and the life thereof is rather short due to excessive heat to which they are subjected.

It is proposed through the use of the present invention to eliminate the use of pneumatic cores and to provide a device which will efficiently sustain the tire against the walls of the mold under proper pressure and is so constructed as to operate in combination with the mold clamp 7.

Flexible metallic pressure plates 9 having a curvature substantially in accordance with the natural curvature of the inner walls of a tire are connected by hinges 10. A bearing plate 11 engages the pressure plates and is recessed to receive the hinges 10 and has secured thereto guide rods 12 to slidably support a follower 13. Interposed between the follower and the bearing plate 11 upon the guide rods are expansion coil type springs 14. The guide rods are screw threaded to receive nuts 15 acting as stops for limiting the sliding movement of the follower 13 under the influence of the springs. The follower and bearing plate are curved from end to end to follow the general circumferential curvature of the tire.

Pairs of links 16 are pivotally connected to the follower and to the pressure plates. The links of each pair cross each other.

In operation, after the tire has been arranged in the mold, the core is positioned in the tire which arranges the follower 13 exteriorly of the tire with the springs 14 fully expanded. The pressure plates 9 are then arranged for contact with the interior walls of the tire. The clamp 7 is then brought into a closed or operative position and carries an adjusting screw 17 and engages the follower 13. By rotating the adjusting screw 17 in the proper direction the follower will be forced downwardly compressing the springs 14 and exerting pressure on the pressure plates 9 and then in turn force the tire tightly against the walls of the mold. The tire is thus sustained tightly against the walls of the mold during the curing operation.

In order that the faces of the beads of the tire may be supported and cured within the mold, pressure plates 19 are provided to engage with the beads of the tire and are provided with screw threaded sockets 20 receiving set screws 21. The set screws 21 engage with the clamp 7 and by rotating the set screws 21 in the proper direction a desired pressure may be placed against the beads of the tire by the pressure plates 19. The pressure plates are curved from end to end to follow the general circumferential contour of the beads of the tire.

Thus it will be seen that a mechanical core has been provided which will operate in combination with a vulcanizing apparatus to efficiently sustain the tire in the mold with proper pressure against the walls of the mold as to effect efficient curing of the repaired place in the tire. Further, it will be seen that the application and removal of the mechanical core can be easily and quickly carried out and further that the core will be serviceable over long periods of time and may be manufactured and sold at a low cost.

If desired, the outer faces of the pressure plates 9 may have applied thereto facing material to contact the inner walls of the tire. This facing material 22 may be rubber or any other material suitable for the purpose.

While I have shown and described the preferred embodiment of my invention, it will be understood that minor changes in construction, combination and arrangement of parts may be made without departing from the spirit and scope of the invention as claimed.

Having thus described my invention, what I claim is:

1. In combination with a tire vulcanizer including a sectional tire mold and a mold clamp, flexible metallic plates hinged to each other and adapted to engage the inner walls of a tire arranged in the mold, and pressure applying means cooperating with the clamp and connected to said plates to force the tire against walls of the mold.

2. In combination with a tire vulcanizer including a sectional tire mold and a mold clamp, metallic flexible pressure plates hinged to each other and engaging inner walls of a tire arranged in the mold, a follower connected to said plates, and a set screw carried by the clamp for engaging the follower.

3. In combination with a tire vulcanizer including a sectional tire mold and a mold clamp, flexible metallic pressure plates hinged to each other and engaging inner walls of a tire arranged in the mold, a follower connected to said plates, a set screw carried by the clamp for engaging the follower, and spring means acting against the follower in opposition to the set screw.

4. In a tire core, metallic flexible plates hinged to each other, a bearing plate engaging the pressure plates, guide rods carried by the bearing plate, a follower slidable on said rods, links pivotally connected to the follower and to the pressure plates and grouped in pairs with the links of each pair crossing each other, and a set screw adapted to engage said follower to impart movement thereto.

5. In a tire core, flexible metallic pressure plates hinged to each other, a bearing plate engaging the pressure plates, guide rods carried by the bearing plate, a follower slidable on said rods, links pivotally connected to the follower and to the pressure plates and grouped in pairs with the links of each pair crossing each other, a set screw engaging said follower to impart movement thereto, plates engaging beads of the tire, and set screws carried by the last-named plates.

ARTHUR A. DORSEY.